US011911793B1

(12) United States Patent
Butler et al.

(10) Patent No.: US 11,911,793 B1
(45) Date of Patent: Feb. 27, 2024

(54) DEEP SUBMERGENCE BENDER TRANSDUCTION APPARATUS

(71) Applicants: John L. Butler, Cohasset, MA (US); Frank D. Fratantonio, Kingston, RI (US); Jethro H. Tannis, Portsmouth, RI (US)

(72) Inventors: John L. Butler, Cohasset, MA (US); Frank D. Fratantonio, Kingston, RI (US); Jethro H. Tannis, Portsmouth, RI (US)

(73) Assignee: Image Acoustics, Inc., Quincy, MA (US)

( * ) Notice: Subject to any disclaimer, the term of this patent is extended or adjusted under 35 U.S.C. 154(b) by 0 days.

(21) Appl. No.: 18/368,176

(22) Filed: Sep. 14, 2023

(51) Int. Cl.
*H01L 41/09* (2006.01)
*B06B 1/06* (2006.01)

(52) U.S. Cl.
CPC ........ *B06B 1/0603* (2013.01); *B06B 2201/74* (2013.01)

(58) Field of Classification Search
CPC .................................................... B06B 1/0603
See application file for complete search history.

(56) References Cited

U.S. PATENT DOCUMENTS 3,233,213 A * 2/1966 Harris ....................... G01S 1/72 367/166
4,332,986 A 6/1982 Butler
4,742,499 A 5/1988 Butler
4,754,441 A 6/1988 Butler
4,845,688 A 7/1989 Butler
4,864,548 A 9/1989 Butler
5,003,517 A * 3/1991 Greer, Jr. ............... G01V 1/184 367/188

(Continued)

OTHER PUBLICATIONS

Butler, John L. et al., "Dipole Transducer Enhancement From a Passive Resonator," J. Acoustic Society vol. 136, No. 5. Nov. 2014, pp. 2472-2477.

(Continued)

*Primary Examiner* — Bryan P Gordon
(74) *Attorney, Agent, or Firm* — David M. Driscoll, Esq.

(57) ABSTRACT

A low frequency underwater sound electro-mechanical transduction bender apparatus for radiating sound at deep submergence depths and including at least one piezoelectric bilaminar or trilaminar beam or disc having opposed support ends; a pair of piezoelectric structures that each have sides that are respectively connected at the opposed support ends of the beam or disc. The piezoelectric bilaminar or trilaminar beam or disc is driven by the pair of piezoelectric structures. The apparatus further includes a housing that contains the piezoelectric bilaminar or trilaminar beam or disc and the pair of piezoelectric structures, as well as an internal fill of a fluid substance. The housing further defines a reflective rear plate that is positioned opposite to the piezoelectric bilaminar or trilaminar beam or disc for reflecting off of it and returning back to the rear section of the frontal disc or beam or a reflective surface from which back radiation from the bender disk reflects at an angle of 45 degrees and travels radially outward or a reflective surface from which back radiation of the bender disk reflects at an angle of 45 degrees and travels radially outward.

21 Claims, 9 Drawing Sheets

(56) References Cited

U.S. PATENT DOCUMENTS

| | | | | |
|---|---|---|---|---|
| 5,047,683 | A | 9/1991 | Butler et al. | |
| 5,184,332 | A | 2/1993 | Butler | |
| 6,734,604 | B2 | 5/2004 | Butler et al. | |
| 6,950,373 | B2 | 9/2005 | Butler et al. | |
| 7,292,503 | B2 | 11/2007 | Butler et al. | |
| 7,372,776 | B2 | 5/2008 | Butler et al. | |
| 7,453,186 | B1 | 11/2008 | Butler et al. | |
| 7,692,363 | B2 | 4/2010 | Butler et al. | |
| 8,072,843 | B1 | 12/2011 | Butler et al. | |
| 8,552,625 | B1 * | 10/2013 | Butler | H10N 30/204<br>310/331 |
| 8,599,648 | B1 | 12/2013 | Butler et al. | |
| 8,659,211 | B1 * | 2/2014 | Butler | H04R 17/06<br>310/370 |
| 8,836,792 | B1 | 9/2014 | Butler | |
| 9,036,029 | B2 | 5/2015 | Butler | |
| 10,774,532 | B2 * | 9/2020 | Döhring | E04C 2/20 |
| 2015/0214466 | A1 * | 7/2015 | Park | B06B 1/14<br>310/324 |

OTHER PUBLICATIONS

Butler and Sherman, Transducers and Arrays for Underwater Sound, p. 265, Springer 2016.

* cited by examiner

DEEP SUBMERGENCE BENDER TRANSDUCTION APPARATUS

FIELD OF THE INVENTION

The present invention relates in general to transducers, and more particularly to underwater acoustic transducers capable of radiating acoustic energy at low frequencies. The present invention also relates to such transducers with bender type piezoelectrical transducer discs or beams with inner and outer parts electrically driven in opposite directions creating a bending motion. Even more particularly the present invention relates to means for operating these transducers at great water depths.

BACKGROUND OF THE INVENTION

Refer to U.S. Pat. No. 10,744,532 for a disclosure of an underwater end driven bender transduction apparatus that operates at a relatively low resonant frequency while achieving a relatively high output level. This patent describes an underwater acoustic transducer that is capable of radiating acoustic energy at low frequencies. It is a transducer which is a resonant low frequency bender-type transducer driven at its end supports by a piezoelectric stack of material operating with inner and outer parts driven in opposite directions creating a bending motion of a radiating beam, plate or disc. The small piezoelectric motions at the beam supports are magnified by the leveraged motion of the bending beam(s) creating a significant output at low frequencies.

One of the challenges of providing an effective transducer, particularly at substantial depths, is that the inherent hydrostatic pressure tends to provide a tension in the piezoelectric material as the disc or beams are bent inward.

Accordingly, it is an object of the present invention to provide an improved underwater end driven bender transduction apparatus that operates at a relatively low resonant frequency while achieving a relatively high output level; and yet does not degrade the piezoelectric material.

SUMMARY OF THE INVENTION

To accomplish the foregoing and other objects, features and advantages of the invention there is provided an improve electro-mechanical bender transduction apparatus that is electrically driven by piezoelectric material, with inner and outer parts thereof driven in opposite directions and with radiation into the open water on the front open side and radiation into the water filled back enclosed rear side. The rear side includes an end enclosed reflector operated at one quarter water wavelength causing canceling back radiation or alternatively with an additional one quarter wavelength transmitted to the forward radiation section arriving in phase with the front radiation and thus doubling the total output.

Furthermore and in accordance with the present invention there is provided a low frequency underwater sound electromechanical transduction bender apparatus for radiating sound at deep submergence depths and that is comprised of:

- at least one piezoelectric bilaminar or trilaminar beam or disc having opposed support ends;
- a pair of piezoelectric structures that each have sides that are respectively connected at the opposed support ends of the beam or disc;
- said piezoelectric bilaminar or trilaminar beam or disc being driven by the pair of piezoelectric structures;
- and a housing that contains the at least one piezoelectric bilaminar or trilaminar beam or disc and the pair of piezoelectric structures, as well as an internal fill of a fluid substance:
- said housing including a reflective rear plate that is positioned opposite to the piezoelectric bilaminar or trilaminar beam or disc.

In accordance with other aspects of the present invention the pair of piezoelectric structures extend transverse to a length of the piezoelectric bilaminar or trilaminar beam or disc; the piezoelectric bilaminar or trilaminar beam or disc is elongated having a straight center axis, and wherein the pair of piezoelectric structures extend substantially perpendicular to the straight center axis of the piezoelectric bilaminar or trilaminar beam or disc; the beam or disc is comprised of a bilaminar beam or disc including a pair of reversed polarity piezoelectric or oppositely wired strips; the beam or disc is comprised of a trilaminar beam or disc including a pair of reversed polarity piezoelectric or oppositely wired strips disposed about an inactive center strip; each of the pair of piezoelectric structures comprises a piezoelectric trilaminar structure; the housing includes a fluid ring structure; the piezoelectric bilaminar or trilaminar beam or disc comprises a trilaminar beam or disc, and wherein the trilaminar beam or disc has a predetermined radiating area; the fluid ring structure has a cross sectional area that is approximately equal to the radiating area of the trilaminar disc or beam; the trilaminar disc or beam has a back and front with the back being 180 degrees out of phase with the front of the radiating trilaminar disc or beam; the reflective rear plate has a through tube which allows a hydrostatic exterior water to fill the interior of the housing and yet retain the interior acoustic wave conditions at frequencies above the Helmholtz resonance of the enclosed interior of the housing; a wavelength at the frequency of resonance of the front of the disc or beam allows an interior wave to extend 180 degrees from a rear of the frontal disc or beam to the back plate, reflecting off of the back plate and returning back to the rear of the frontal disc or beam and thus arrive out of phase and cancelling the rear radiation of the frontal disc or beam allowing maximum motion of the frontal radiating disc or beam; the beam or disc operates at deep water depths by means of water behind the radiating disc or beam operating at the same pressure as the water in front of the disc or beam by means of direct or indirect reflection of the acoustic wave generated behind the forward radiating disc or beam; the housing contains water at the same pressure as water in front of the radiating disc or beam; the fluid substance is water that is filled from the outside by means of a small pipe hole that is part of a Helmholtz radiator of frequency that is well below an operating frequency of the beam or disc; the fluid substance is water that is filled from the outside by means of a ring opening that allows an inside back radiation to radiate in phase with a front radiating disc or beam; for the same area, for a total radiation of twice an original acoustic level; a back radiation from the bender disc or beam travels toward the rear, reflects at the reflective rear plate at an angle of 45 degrees. and travels radially outward; the radiation then reflects at another 45 degrees to head to a top of the outside ring and arrive in phase with the forward original disc or beam; the reflective rear plate in the housing includes at least one 45 degree surface where a wave from the beam or disc emanates; and including a second 45 degree surface that redirects the wave back to the beam or disc.

BRIEF DESCRIPTION OF THE DRAWINGS

Numerous other objects, features and advantages of the invention should now become apparent upon a reading of the following detail description taken in conjunction with the accompanying drawings, in which.

DETAILED DESCRIPTION

In accordance with the present invention, there is now described a number of different embodiments for practicing the present invention. In the main aspect of the invention there is provided at least one bending beam or disc 10 mounted on end supports 30 to create the bending beam or disc action and low frequency acoustic radiation into the intended gas or fluid medium such as water.

Figure 1B:
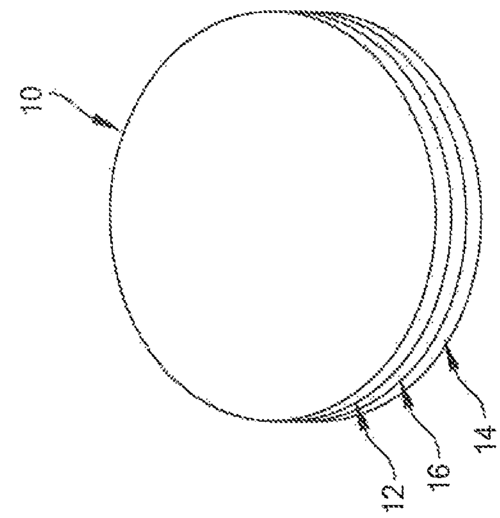
FIG. 1B is a perspective view of the bender model of FIG. 1A.
Figure 1A:
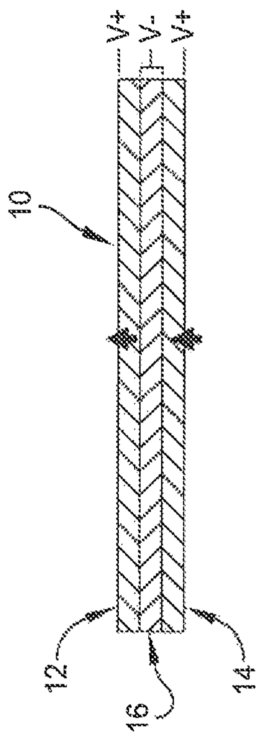
FIG. 1A illustrates the cross section of a trilaminar bender model disc or beam.

FIG. 1A illustrates the cross section of a trilaminar bender disc or beam. FIG. 1B is a perspective view of the bender apparatus 10 of FIG. 1A. FIG. 1A shows the cross section of the radiating bending beam or disc 10 illustrating a trilaminar version where the darker center strip 16 is solid inactive material between two reversed piezoelectric or oppositely wired strips 12, 14. An example of the bender disc configuration is shown in FIG. 1A. No inactive strip would be used in a bilaminar embodiment.

Piezoelectric discs may be used in pairs to create a bender disc by attaching them together and exciting them in the opposite 31 mode of operation in a bilaminar or in a trilaminar arrangement with an inactive central location. FIG. A1 is a cross section of a trilaminar embodiment. For the case with the upper section extended in length and the bottom section contracted in length there would be upward bending with the whole trilaminar set 20 mounted on and pivoted on end supports 30. The disc motion moves in the opposite downward direction as the piezoelectric drive reverses phase. The piezoelectric disc with water on the outer radiating side and air on the enclosed rear side can experience high and possibly destructive tension on the rear side of the bilaminar or trilaminar structure when used in deep water applications. We present here two means for avoiding this possible high-tension case.

Figure 2B:
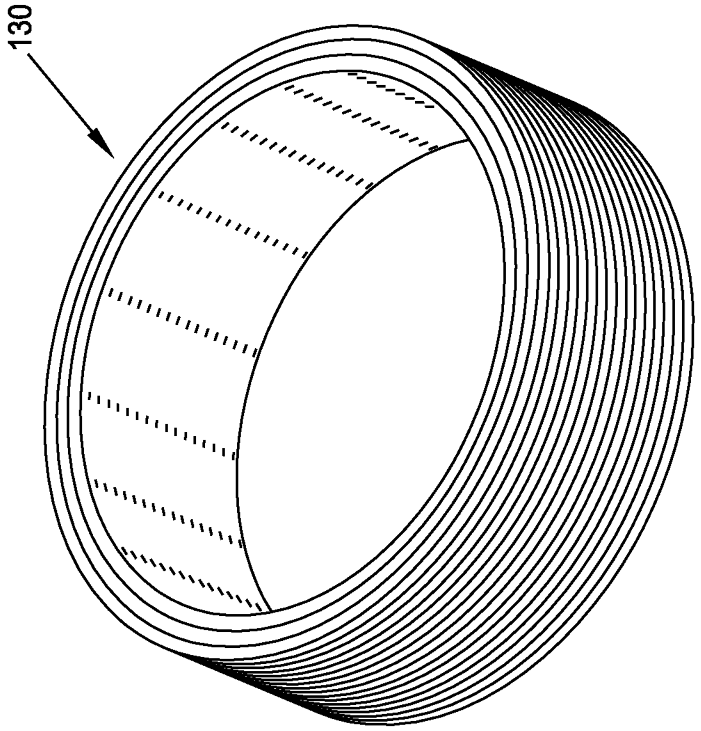
FIG. 2B illustrates an isometric view of the cylindrical bender of FIG. 2A.
Figure 2A:
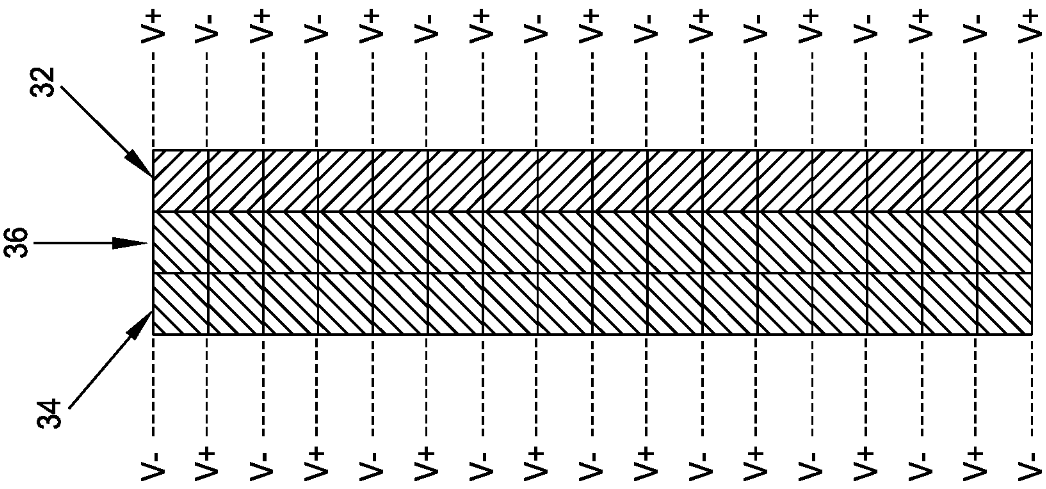
FIG. 2A illustrates the support structure in a cross-sectional view with outer piezoelectric layers and a middle inert layer.
Figure 3B:
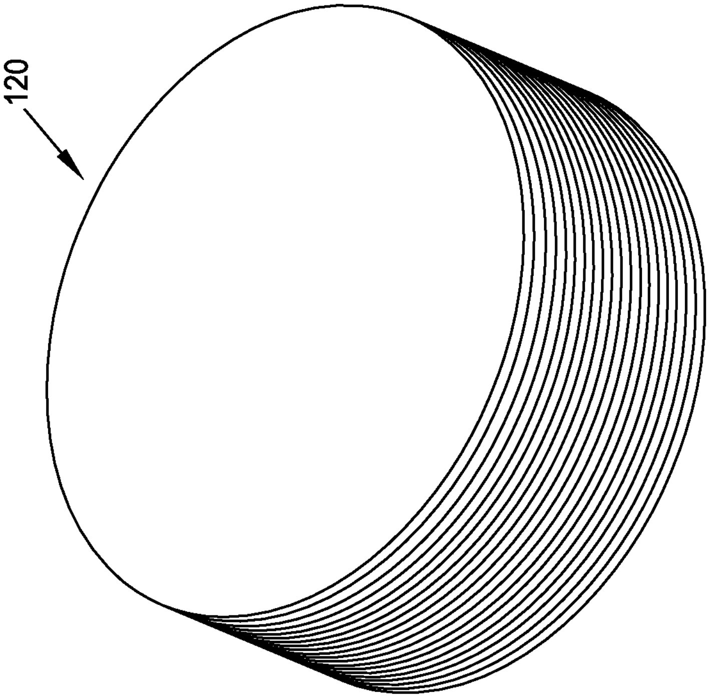
FIG. 3B is an isometric view of FIG. 3A showing the piezoelectric bender disc and cylindrical bender in an end driven bender configuration.
Figure 3A:
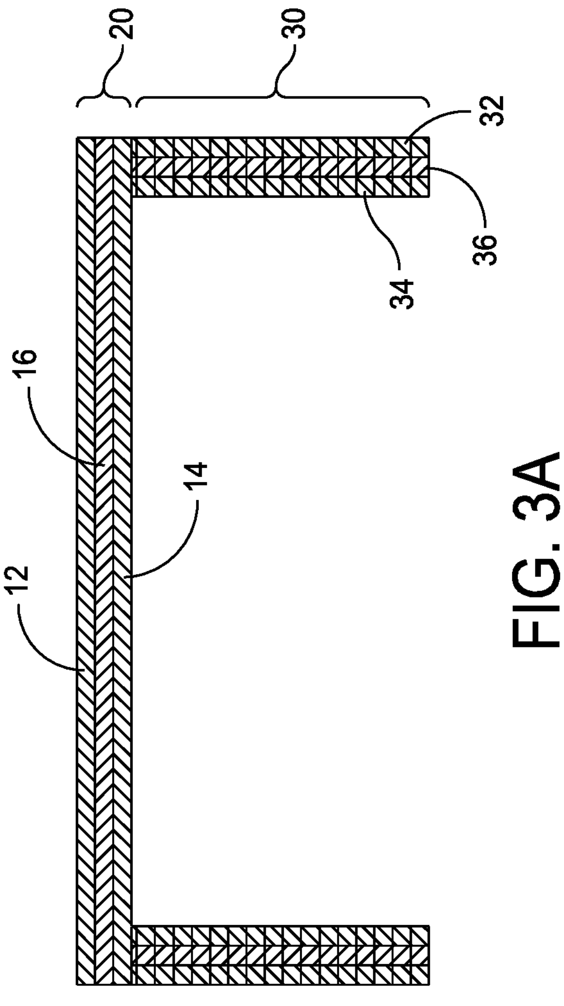
FIG. 3A illustrates a cross-sectional view of the trilaminar set mounted on end supports.

FIG. 2A illustrates the support structure in a cross-sectional view including outer piezoelectric layers 32, 34 and a middle inert layer 36. FIG. 2A illustrates the particular voltage pattern that is applied. FIG. 2B is an isometric view of the piezoelectric support structure. This is illustrated in FIG. 2B by the reference number 110. Refer also to FIGS. 3A and 3B and the associated support structure 30 along with the respective piezoelectric layers 32, 34 and middle inert layer 36.

Figure 4B:
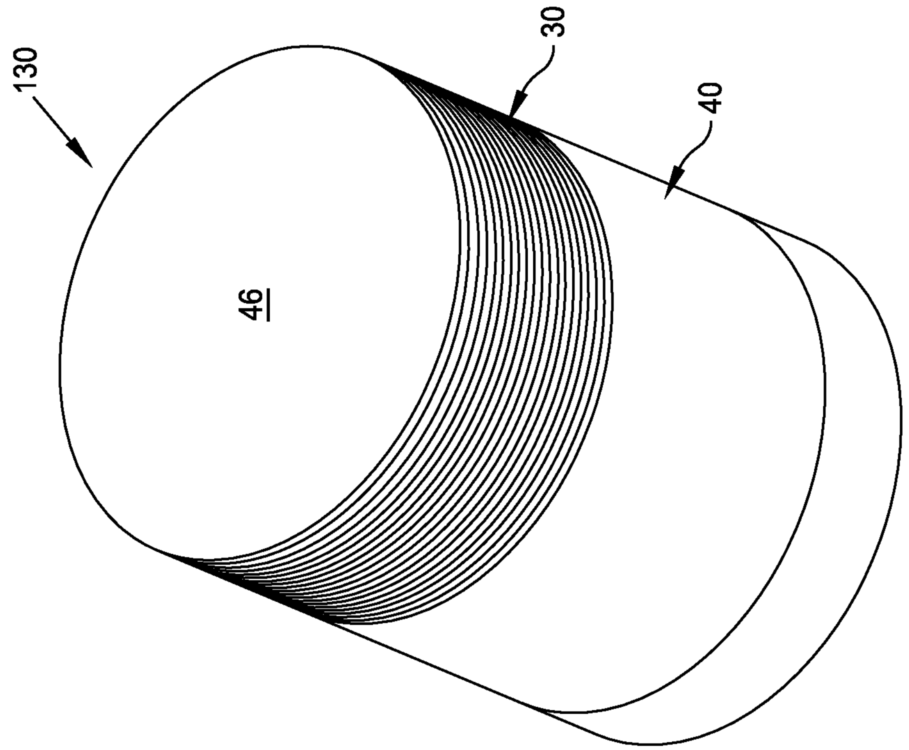
FIG. 4B is an isometric view of a free-flooded end driven bender and enclosure of FIG. 4A.
Figure 4A:
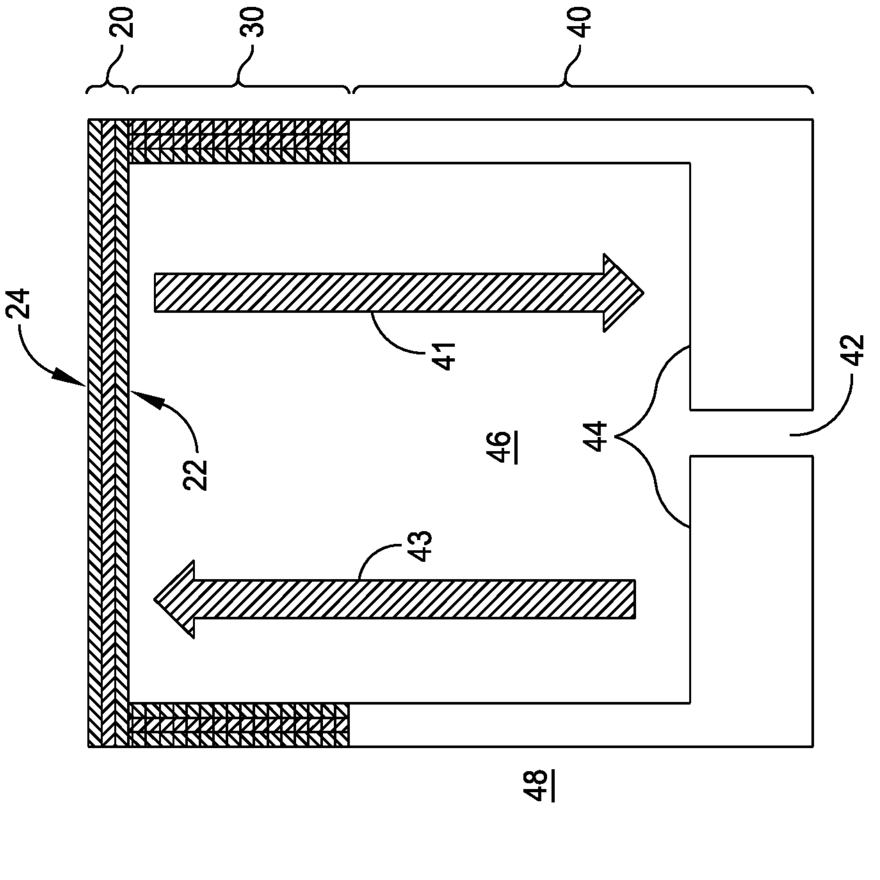
FIG. 4A is a cross-sectional view of the bender structure as associated with an enclosure.

FIG. 3A shows the cross section of the case where the radiating trilaminar case or strip 20 is mounted on a piezoelectric trilaminar end structure 30 mounted on top of a metal structure (see FIG. 4A). For the case of a radiating disc the end support structure 30 would be a cross section of a cylinder as depicted at 120 in FIG. 3B; while for a radiating beam the end support would be two beams. This piezoelectric end structure 30 could be used to enhance or replace the output from the original bending disc or beam radiating structure. FIG. 3B is an isometric view of the piezoelectric bender disc and cylindrical bender in an end driven bender configuration.

FIG. 4A shows the cross section for the case of a complete enclosure 40 filled with water from the exterior through the bottom tube passage way 42. FIG. 4A Illustrates the quarter wavelength back section set for a rear wave single reflection and interior cancellation of the rear part of the front radiating disc or beam; a result due to a stiff back reflector 44 with a low Helmholtz frequency tube for rear water filling, creating a hydrostatic pressure equalization.

In FIG. 4A the fluid filled tube allows a fluid filled interior and is designed so that the Helmholtz resonance of the two is well below the operating band of the trilaminar radiating beam or disc but yet allows the interior fluid 46 to be of the same hydrostatic pressure as the exterior 48. The interior distance between the thick reflecting metallic back plate 44, which contains the tube, and the back 22 of the trilaminar disc or beam 20 is equal to a quarter wavelength of the resonant frequency of the forward radiating trilaminar disc or beam 20. This arrangement allows the back radiation of the trilaminar disc or beam 20 to travel within the enclosed water 46, down to the metallic back plate 44 and reflect back on to the rear 22 of the radiating trilaminar disc or beam 20 with a total phase shift of 180 degrees thereby canceling the interior radiation at resonance and thus providing only exterior radiation at resonance without hydrostatic pressure; thus causing the trilaminar disc or beam 20 to experience tension even at the greatest depths because of the equal hydrostatic pressure on both sides 22, 24 of the radiating disc or beam 20. In FIG. 4A refer to the arrow 41 (original acoustic wave), and the return arrow 43 where the radiation reflects back from surface 44 to the back surface 22 of the disc or beam 20.

Reference is now made to FIG. 4B which is an isometric view of a free-flooded end driven bender and enclosure of FIG. 4A. This view is depicted at 130 and illustrates the trilaminar disc or beam 20, and the piezoelectric trilaminar end structure 30.

Figure 5A:
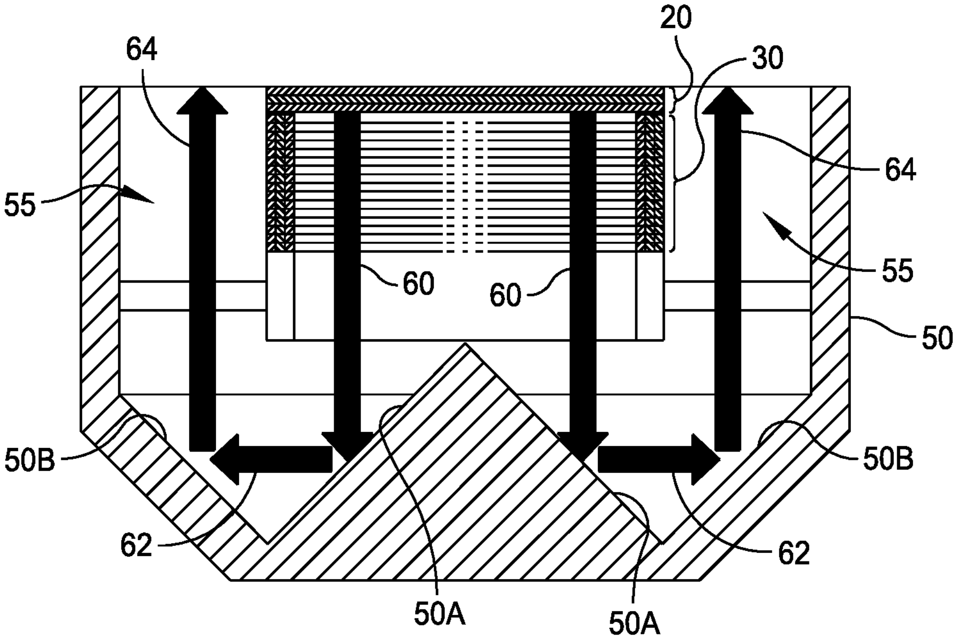
FIG. 5A is a cross-sectional view of a cylindrical bender structure as associated with an enclosure wherein the back radiation doubly reflects from the rear and travels through an outer water ring section arriving in phase with the disc or beam outer radiation; thus increasing the output.

FIG. 5A shows the cross section for an alternative embodiment in accordance with the present invention where the lower back water-based radiation is not canceled but instead is used to enhance the output of the radiating disc or beam piezoelectric structure 30. Here the housing 50 is radially extended with a fluid ring type structure with a cross sectional area approximately equal to the radiating area of the trilaminar disc or beam 20. In operation, the back radiation of the radiating trilaminar disc or beam 20 travels toward the inner 45 degree reflector 50A at the base of the structure and follows this to the outer 45 degree reflector 50B and is then sent up to the ring opening 55 adjacent to the trilaminar radiator. Here the trip length is set for a 180 degree phase shift from the rear of the base trilaminar radiator at its fundamental resonance. The back radiation is 180 degrees different than the forward radiation. Because of the 180 degree travel time from the rear to the front, the back radiation now arrives in phase with forward radiation causing a 6 dB improvement in the forward output for the case of the ring radiating area the same as the radiating disc area. FIG. 5A also illustrates a quarter section showing the interior support structure. The system will still function but not fully attain a 6 dB improvement if the angle is not exactly 45 degrees.

In FIG. 5A refer to the following arrows that depict the various acoustic waves:

- 60—the original wave from the disc or beam 20 to the reflector surface 50A;
- 62—the reflection from the reflector surface 50A to a companion 45 degree reflecting surface 50B'
- 64—the further reflection from surface 50B into the outer ring opening 55 and to the back surface 22 of the disc or beam 20.

Figure 5B:
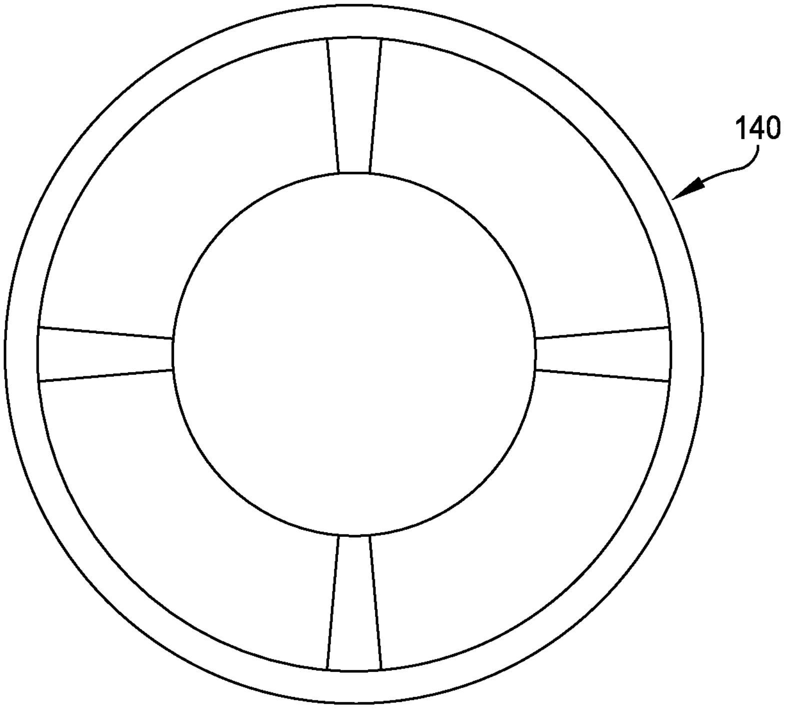
FIG. 5B is a top view of the cylindrical end driven bender and reflector housing of FIG. 5A.

Reference is now made to FIG. 5B which is a top view at 140 of a cylindrical version of the end driven bender and associated reflector housing.

Figure 6A:
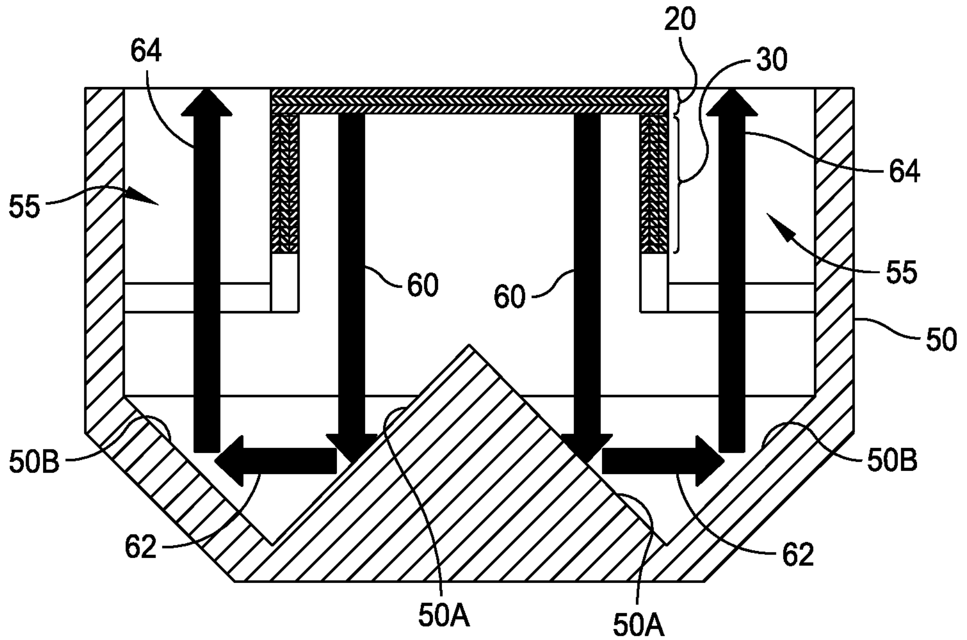
FIG. 6A is a cross-sectional view of a rectangular bender structure as associated with an enclosure wherein the back radiation doubly reflects from the rear and travels through an outer water ring section arriving in phase with the disc or beam outer radiation; thus increasing the output.
Figure 6B:
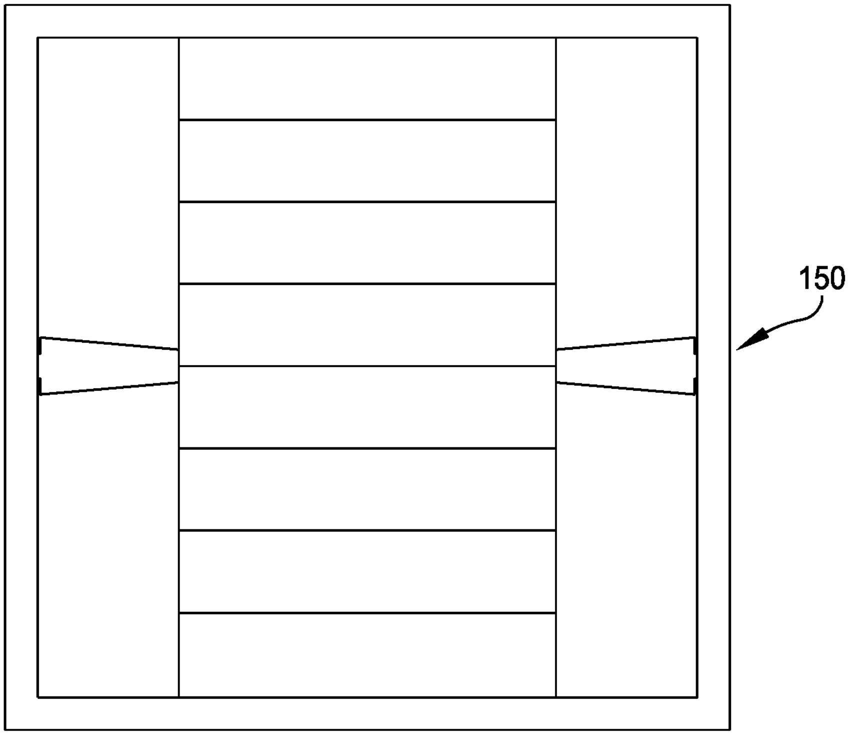
FIG. 6B is a top view of the rectangular and end driven bender and reflector housing of FIG. 6A.

Reference is now made to FIGS. 6A and 6B. FIG. 6A is a cross-sectional view of a rectangular bender structure as associated with an enclosure wherein the back radiation doubly reflects from the rear and travels through an outer water ring section arriving in phase with the disc or beam outer radiation; thus increasing the output. FIG. 6B is a top view of the rectangular and end driven bender and reflector housing of FIG. 6A. Whereas the embodiments illustrated in FIGS. 5A and 5B are directed to a cylindrical version, the embodiment illustrated in FIGS. 6A and 6B are directed toward a rectangular version. Even though these are separate embodiments, the same reference numbers are used in FIG. 6A as previously described in FIG. 5A.

Thus, in the embodiment described in FIGS. 6A and 6B, there is shown a cross-section wherein the radiation is not cancelled but instead is used to enhance the output of the radiating disc or beam piezoelectric structure. Here the housing 50 is radially extended with a fluid ring type structure with a cross sectional area approximately equal to the radiating area of the trilaminar disc or beam 20. In operation, the back radiation of the radiating trilaminar disc or beam 20 travels toward the inner 45 degree reflector 50A at the base of the structure and follows this to the outer 45 degree reflector 50B and is then sent up to the ring opening 55 adjacent to the trilaminar radiator. Here the trip length is set for a 180 degree phase shift from the rear of the base trilaminar radiator at its fundamental resonance. The back radiation is 180 degrees different than the forward radiation. Because of the 180 degree travel time from the rear to the front, the back radiation now arrives in phase with forward radiation causing a 6 dB improvement in the forward output for the case of the ring radiating area the same as the radiating disc area. FIG. 6A also illustrates a quarter section showing the interior support structure. The system will still function but not fully attain a 6 dB improvement if the angle is not exactly 45 degrees.

In FIG. 6A refer to the following arrows that depict the various acoustic waves:

- 60—the original wave from the disc or beam 20 to the reflector surface 50A;
- 62—the reflection from the reflector surface 50A to a companion 45 degree reflecting surface 50B'
- 64—the further reflection from surface 50B into the outer ring opening 55 and to the back surface 22 of the disc or beam 20.

Figure 7:
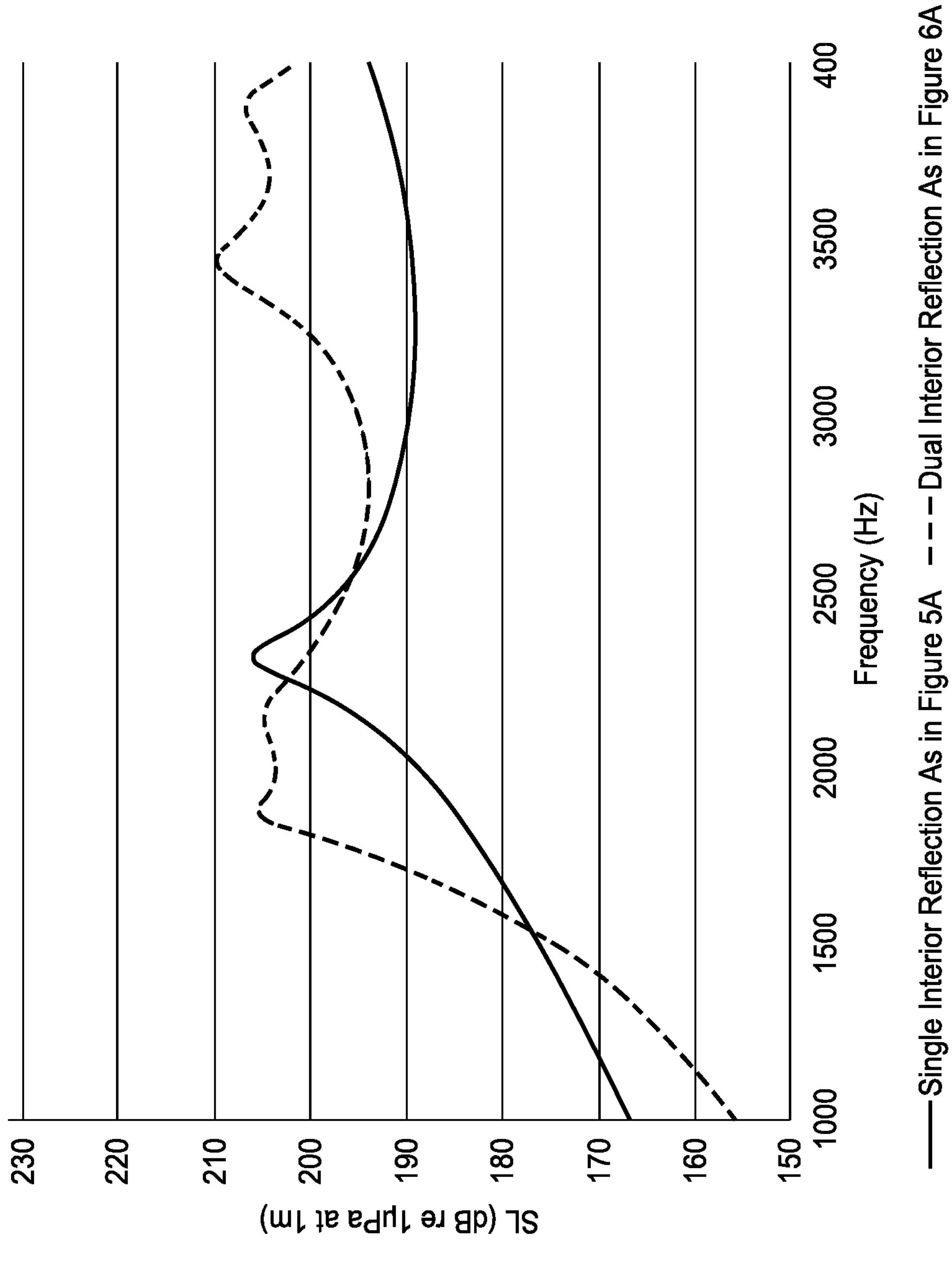
FIG. 7 illustrates the Sound Pressure Level, SPL with dual drive (both disc or beam and end drives active) for both enclosed single and dual internal reflector conditions.

FIG. 7 illustrates the fully driven Sound Pressure Level, SPL with dual drive (both disc and end drives active) for both enclosed single and dual internal reflector conditions (FIGS. 5A and 6A). The dimensions for the single reflection results are 5.5 inches for the diameter of the top frontal disc or beam length with a 1.85 inch high trilaminar cylindrical or beam end supports and an overall enclosure height of 6.2 inches. While for the case of the double reflector, the full diameter is 10.4 inches and the height is 6.6.

Figure 8:
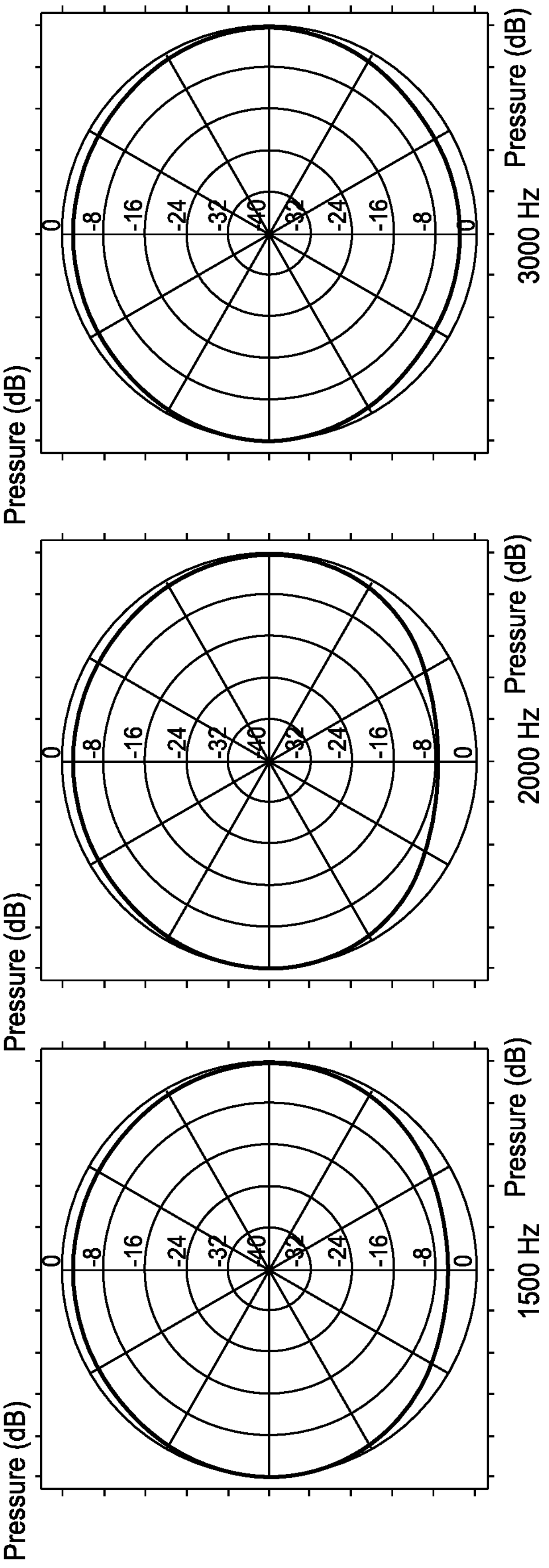
FIG. 8 illustrates the beam patterns for single interior reflection conditions.
Figure 9:
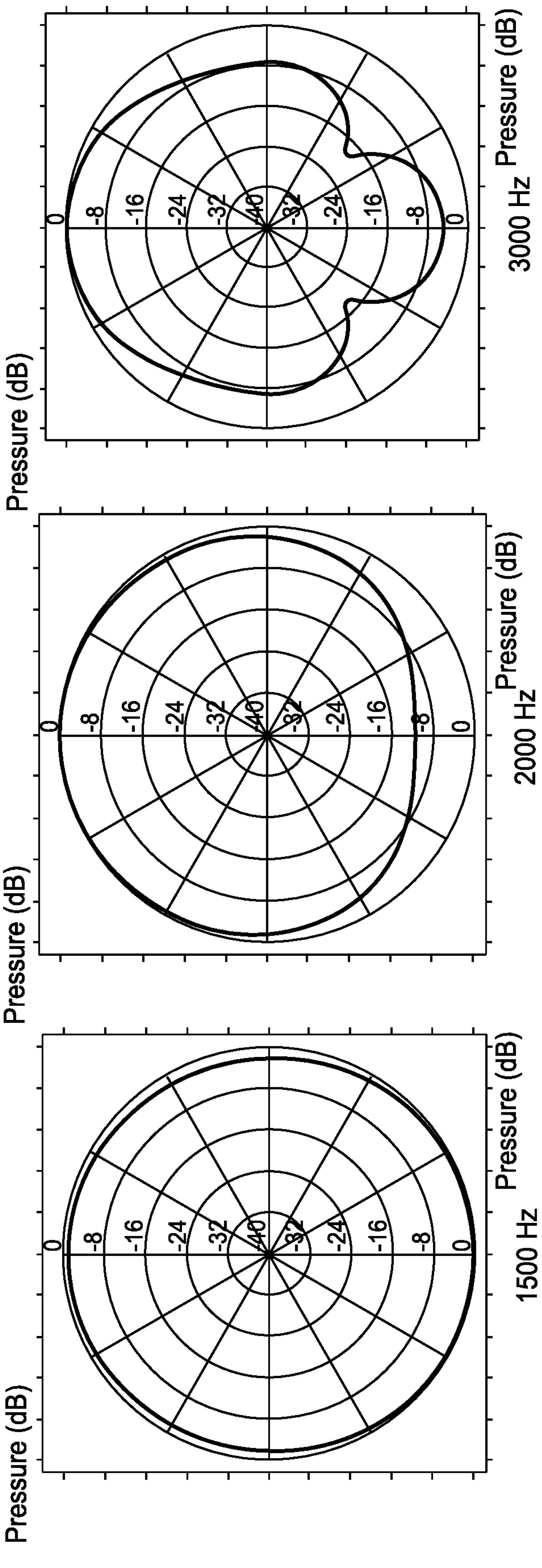
FIG. 9 illustrates the beam patterns for dual interior reflection conditions.

FIGS. 8 and 9 illustrate the beam patterns for both single and dual interior reflection conditions respectively for the response given in FIG. 7.

The following is a summary of important aspects of the present invention.

1. An underwater sound electro-mechanical bender beam or disc transducer which can operate at deep water depths by means of water behind the radiating disc or beam operating at the same pressure as the water in front of the disc or beam by means of direct or indirect reflection of the acoustic wave generated behind the forward radiating disc or beam.
2. An underwater sound electro-mechanical bender beam or disc transducer which is piezoelectric.
3. An underwater sound mechanical bender beam or disc transducer which is end driven by piezoelectric end driver supports.
4. An underwater sound electro-mechanical bender beam or disc transducer with a rear housing that contains water at the same pressure as water in front of the radiating disc or beam.
5. An underwater sound electro-mechanical bender beam or disc transducer with a rear housing that is filled with water from the outside by means of a small pipe hole that is part of a Helmholtz radiator of frequency that is well below the operating frequency of the bender beam or disc transducer.
6. An underwater sound electro-mechanical bender beam or disc transducer with a rear housing that is filled with water from the outside by means of a ring opening that allows the inside back radiation to radiate in phase with the front radiating disc or beam and if of the same area for a total radiation of twice the original acoustic level.
7. The conditions of case 6 where the back radiation from the original bender disc or beam travels to the rear, reflects at the rear housing plate at an angle of 45 degrees, travels radially outward and then reflects at another 45 degrees but heads to the top of the outside ring so as to arrive in phase with the forward original wave from the disc or beam.

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A low frequency underwater sound electro-mechanical transduction bender apparatus for radiating sound at deep submergence depths and that is comprised of:

at least one piezoelectric bilaminar or trilaminar beam or disc having opposed support ends;

a pair of piezoelectric structures that each have sides that are respectively connected at the opposed support ends of the beam or disc;

said piezoelectric bilaminar or trilaminar beam or disc being driven by the pair of piezoelectric structures;

and a housing that contains the at least one piezoelectric bilaminar or trilaminar beam or disc and the pair of piezoelectric structures, as well as an internal fill of a fluid substance:

said housing including a reflective rear plate that is positioned opposite to the piezoelectric bilaminar or trilaminar beam or disc.

2. The low frequency underwater sound electro-mechanical transduction bender apparatus of claim 1 wherein the pair of piezoelectric structures extend transverse to a length of the piezoelectric bilaminar or trilaminar beam or disc.

3. The low frequency underwater sound electro-mechanical transduction bender apparatus of claim 1 wherein the piezoelectric bilaminar or trilaminar beam or disc is elongated having a straight center axis, and wherein the pair of piezoelectric structures extend substantially perpendicular to the straight center axis of the piezoelectric bilaminar or trilaminar beam or disc.

4. The low frequency underwater sound electro-mechanical transduction bender apparatus of claim 1 wherein the beam or disc is comprised of a bilaminar beam or disc including a pair of reversed polarity piezoelectric or oppositely wired strips.

5. The low frequency underwater sound electro-mechanical transduction bender apparatus of claim 1 wherein the beam or disc is comprised of a trilaminar beam or disc including a pair of reversed polarity piezoelectric or oppositely wired strips disposed about an inactive center strip.

6. The low frequency underwater sound electro-mechanical transduction bender apparatus of claim 1 wherein each of the pair of piezoelectric structures comprises a piezoelectric trilaminar structure.

7. The low frequency underwater sound electro-mechanical transduction bender apparatus of claim 1 wherein the housing includes a fluid ring structure.

8. The low frequency underwater sound electro-mechanical transduction bender apparatus of claim 7 wherein the piezoelectric bilaminar or trilaminar beam or disc comprises a trilaminar beam or disc, and wherein the trilaminar beam or disc has a predetermined radiating area.

9. The low frequency underwater sound electro-mechanical transduction bender apparatus of claim 8 wherein the fluid ring structure has a cross sectional area that is approximately equal to the radiating area of the trilaminar disc or beam.

10. The low frequency underwater sound electro-mechanical transduction bender apparatus of claim 8 wherein the trilaminar disc or beam has a back and front with the back being 180 degrees out of phase with the front of the radiating trilaminar disc or beam.

11. The low frequency underwater sound electro-mechanical transduction bender apparatus of claim 1 wherein the reflective rear plate has a through tube which allows a hydrostatic exterior water to fill the interior of the housing and yet retain the interior acoustic wave conditions at frequencies above the Helmholtz resonance of the enclosed interior of the housing.

12. The low frequency underwater sound electro-mechanical transduction bender apparatus of claim 11 wherein a wavelength at the frequency of resonance of the front of the disc or beam allows an interior wave to extend 180 degrees from a rear of the frontal disc or beam to the back plate, reflecting off of the back plate and returning back to the rear of the frontal disc or beam and thus arrive out of phase and cancelling the rear radiation of the frontal disc or beam allowing maximum motion of the frontal radiating disc or beam.

13. The low frequency underwater sound electro-mechanical transduction bender apparatus of claim 1 wherein the beam or disc operates at deep water depths by means of water behind the radiating disc or beam operating at the same pressure as the water in front of the disc or beam by means of direct or indirect reflection of the acoustic wave generated behind the forward radiating disc or beam.

14. The low frequency underwater sound electro-mechanical transduction bender apparatus of claim 1 wherein the housing contains water at the same pressure as water in front of the radiating disc or beam.

15. The low frequency underwater sound electro-mechanical transduction bender apparatus of claim 1 wherein the fluid substance is water that is filled from the outside by means of a small pipe hole that is part of a Helmholtz radiator of frequency that is well below an operating frequency of the beam or disc.

16. The low frequency underwater sound electro-mechanical transduction bender apparatus of claim 1 wherein the fluid substance is water that is filled from the outside by means of a ring opening that allows an inside back radiation to radiate in phase with a front radiating disc or beam.

17. The low frequency underwater sound electro-mechanical transduction bender apparatus of claim 16 wherein for the same area, for a total radiation of twice an original acoustic level.

18. The low frequency underwater sound electro-mechanical transduction bender apparatus of claim 1 wherein a back radiation from the bender disc or beam travels toward the rear, reflects at the reflective rear plate at an angle of 45 degrees, and travels radially outward.

19. The low frequency underwater sound electro-mechanical transduction bender apparatus of claim 18 wherein the radiation then reflects at another 45 degrees to head to a top of the outside ring and arrive in phase with the forward original disc or beam.

20. The low frequency underwater sound electro-mechanical transduction bender apparatus of claim 1 wherein the reflective rear plate in the housing includes at least one 45 degree surface where a wave from the beam or disc emanates.

21. The low frequency underwater sound electro-mechanical transduction bender apparatus of claim 20 including a second 45 degree surface that redirects the wave back to the beam or disc.

* * * * *